(12) United States Patent
Radwallner et al.

(10) Patent No.: US 7,690,497 B2
(45) Date of Patent: Apr. 6, 2010

(54) TRANSFER DEVICE FOR THE LATERAL EJECTION OF TRANSPORTED GOODS AND TRANSPORT UNIT

(75) Inventors: Günther Radwallner, Vöcklabruck (AT); Rudolf Hansl, Linz (AT)

(73) Assignee: TGW Transportgeräte GmbH, Wels (AT)

( * ) Notice: Subject to any disclaimer, the term of this patent is extended or adjusted under 35 U.S.C. 154(b) by 595 days.

(21) Appl. No.: 11/547,929

(22) PCT Filed: Apr. 6, 2005

(86) PCT No.: PCT/AT2005/000119

§ 371 (c)(1),
(2), (4) Date: Jan. 31, 2007

(87) PCT Pub. No.: WO2005/097638

PCT Pub. Date: Oct. 20, 2005

(65) Prior Publication Data

US 2008/0271975 A1     Nov. 6, 2008

(30) Foreign Application Priority Data

Apr. 9, 2004  (AT) ............................. A 628/2004

(51) Int. Cl.
*B65G 47/76* (2006.01)
*B65G 47/74* (2006.01)

(52) U.S. Cl. ..................... 198/457.03; 198/457.06; 198/440; 198/597

(58) Field of Classification Search ................ 198/457, 198/597, 370, 367
See application file for complete search history.

(56) References Cited

U.S. PATENT DOCUMENTS 3,929,218 A  *  12/1975  Risley .................. 198/573

(Continued)

FOREIGN PATENT DOCUMENTS

DE       39 16 424 C2    11/1990

(Continued)

OTHER PUBLICATIONS

International Search Report.

*Primary Examiner*—Gene Crawford
*Assistant Examiner*—Kavel P Singh
(74) *Attorney, Agent, or Firm*—Collard & Roe, P.C.

(57) ABSTRACT

The invention relates to a transfer mechanism (12) for separating conveyed objects (4) out to the side from a first conveyor system (1) onto another conveyor system (14), with a pushing unit and two parallel flexible drives (15a, b) at a distance apart extending at an angle with respect to the longitudinal direction of the first conveyor system (1), each of which has an endless traction means (23) which can be driven, and the pushing unit has oppositely lying drivers secured to the traction means (23) and a profiled pushing element (29) which is able to slide out of an initial position at the side, adjacent to a conveyor path (6), into an operating position in the conveyor path (6). The pushing element (29) extends continuously between the two flexible drives (15a, b) and is mounted on the drivers so that it can be moved by means of articulated arrangements exclusively about the first axis extending perpendicular to the conveyor plane (18) of the conveyed objects (4) and about the second axis extending parallel with the transfer direction (13) of the transfer mechanism (12). The invention further relates to a conveyor system (1) in which the transfer mechanism (12) is integrated.

23 Claims, 6 Drawing Sheets

U.S. PATENT DOCUMENTS

| | | | |
|---|---|---|---|
| 5,944,165 A * | 8/1999 | Mannlein et al. | 198/442 |
| 6,516,937 B1 | 2/2003 | Deer | |
| 6,962,250 B2 * | 11/2005 | Van Liempd et al. | 198/457.06 |

FOREIGN PATENT DOCUMENTS

| | | |
|---|---|---|
| DE | 298 07 105 U1 | 9/1998 |
| EP | 0 062 233 A2 | 10/1982 |
| EP | 1 260 467 A | 11/2002 |
| WO | WO 98/57875 A1 | 12/1998 |
| WO | WO 03/064303 A | 8/2003 |

* cited by examiner

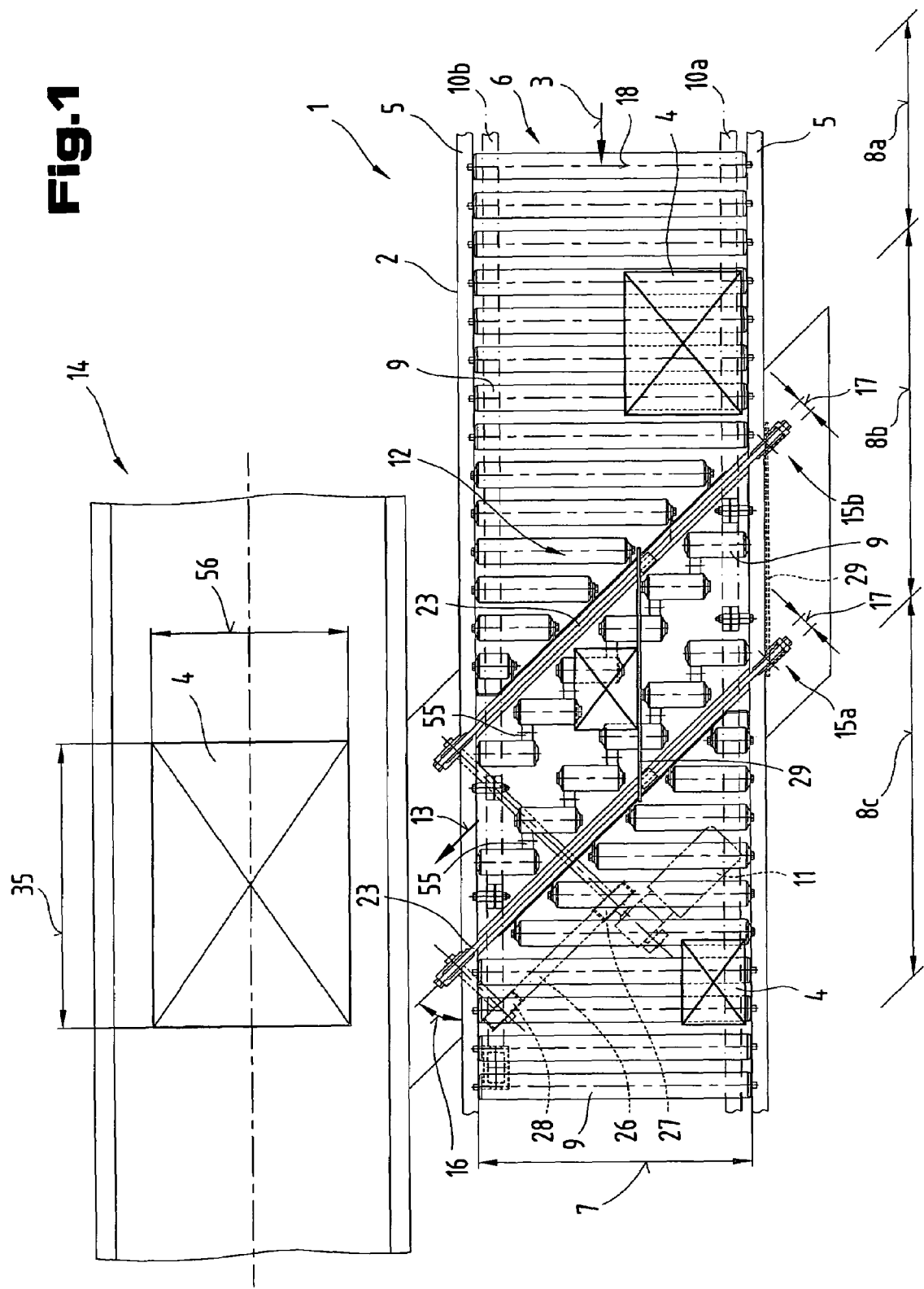

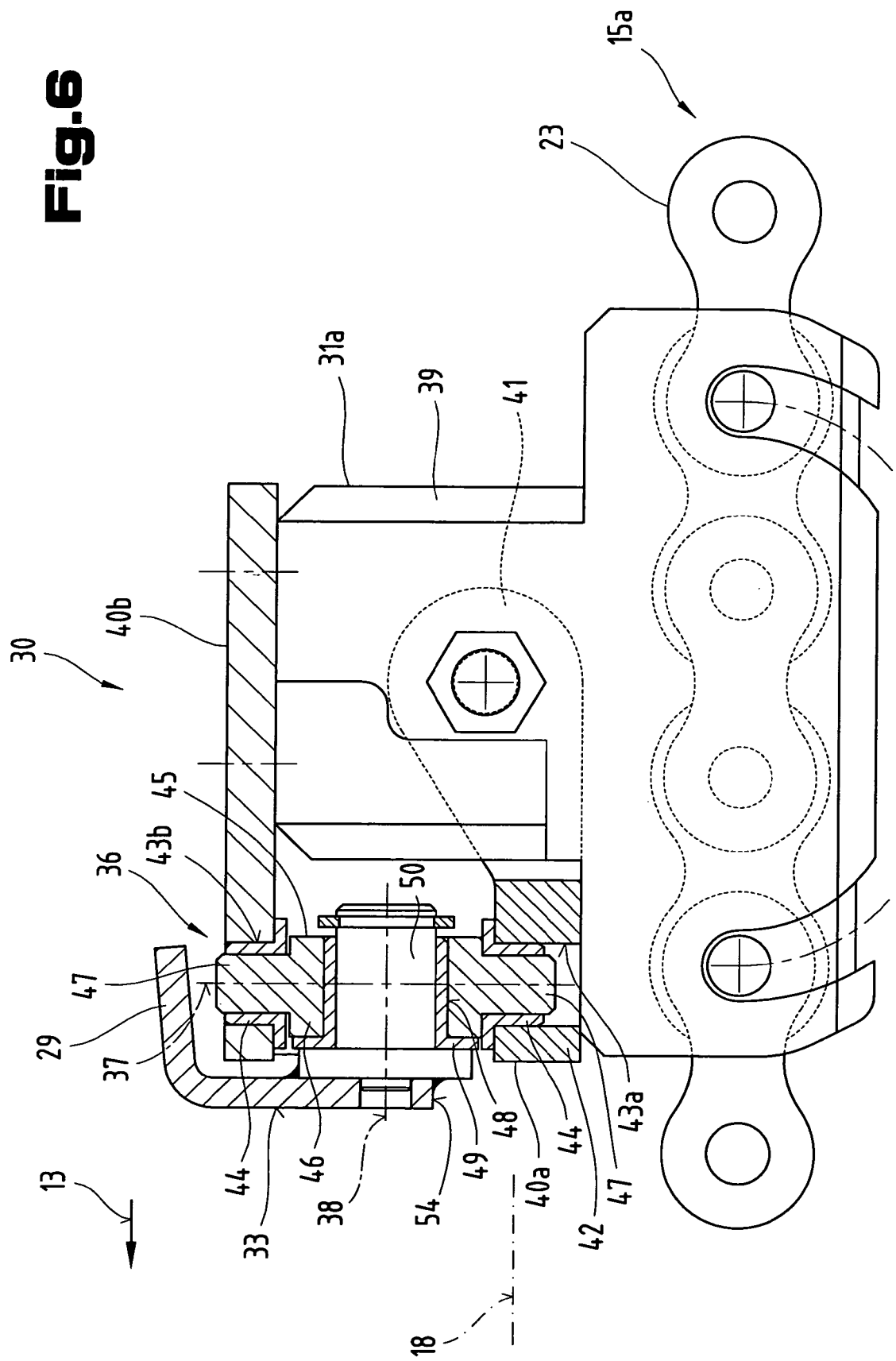

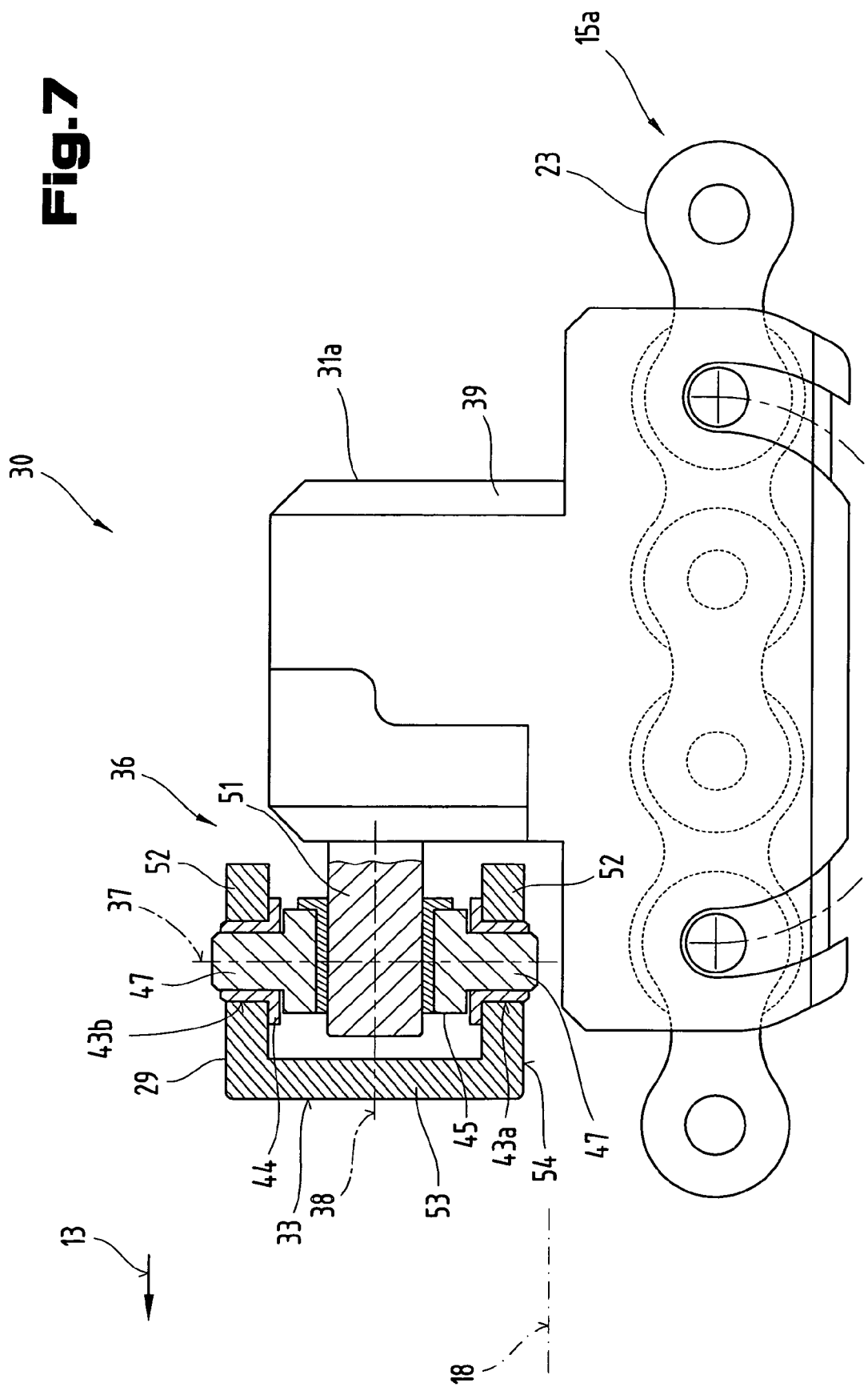

TRANSFER DEVICE FOR THE LATERAL EJECTION OF TRANSPORTED GOODS AND TRANSPORT UNIT

CROSS REFERENCE TO RELATED APPLICATIONS

Applicants claim priority under 35 U.S.C. §119 of Austrian application No. A 628/2004 filed on Apr. 9, 2004. Applicants also claim priority under 35 U.S.C. §365 of PCT/AT2005/000119 filed Apr. 6, 2005. The international application under PCT article 21(2) was not published in English.

The invention relates to a transfer mechanism for separating conveyed objects to the side of a conveyor system and a conveyor system equipped with same, of the type described in the introductory parts of claims 1 and 22.

Patent specification WO 03/064303 A1 discloses a system for conveying objects in the form of rollers between two conveyor systems extending at an angle with respect to one another, with a transfer mechanism disposed between the two conveyor systems. The transfer mechanism comprises two parallel flexible drives disposed at a distance above a conveyor plane of the conveyor systems, which run at an angle with respect to the first conveyor system (L1) in the direction of a speed resulting from the speed of the first conveyor system (L1) and the transfer speed oriented transversely to it, and each has a toothed belt guided by a drive and guide pulley. The drive and guide pulleys are mounted in a frame so as to be rotatable and the driving gears are driven synchronously by means of two flexible drives coupled on a common drive shaft. This drive shaft is mounted above the transfer mechanism on the two frames so as to be rotatable and is coupled with only one electric motor. The transfer mechanism also has a pushing unit between the parallel flexible drives, with two bar-type pushing elements (11) extending transversely to the conveying direction of the conveyed objects, which are respectively connected to the toothed belt in an articulating arrangement by their ends via a ball joint (10, 10') and driver (9, 9'). Each pushing element bears a plate-shaped stop element (12) in the region of one end. When the conveyed object has to be transferred from the first conveyor system to the second conveyor system, the pushing element (11) is moved from the top strand of the flexible drives in the direction towards the bottom strand of the flexible drives, positioned behind the conveyed object, and pushed by the forward feed movement of the toothed belt against the object and the stop element to the side of the conveyed object. The object is then pushed off in the direction parallel with the longitudinal extension of the flexible drives. In order to enable relatively long objects to be conveyed from the first conveyor system onto the second conveyor system via the transfer mechanism, it is also necessary to provide a lateral guide (13) extending parallel with the flexible drive, against which the conveyed object lies by the front edge whilst it is being transferred. Accordingly, there is a risk that even slight damage to the edge lying against the lateral guide may lead to an undesirable change in friction between the conveyed object and lateral guide, causing the conveyed object to be pushed onto the second conveyor system out of line or to turn between the pushing element and lateral guide. With this known design, it is also necessary to provide a large gap distance between two objects conveyed one after the other on the first conveyor system so that the pushing element is able to dip through the gap during its movement along the deflection path from the top strand to the bottom strand of the toothed belt without colliding, which means that the throughput rate is too low for many practical applications.

Document DE 298 07 105 U1 discloses a conveyor system with a transfer mechanism, by means of which the conveyed object can be separated sideways out of the conveyor system onto another conveyor system disposed downstream of the transfer mechanism in the transfer direction of the conveyed objects when the roller track is being driven. In order to separate conveyed objects to the side, the transfer mechanism has at least two chain strands extending at an angle with respect to the conveying direction, in a region with a reduced diameter, respectively between at least two segments of the conveyor rollers, on which pin-type pushing elements projecting out from the conveyor plane of the conveyor rollers are mounted. The chain strands are provided on only a part-width of a conveyor path formed by the roller track and extend parallel at a distance from one another. With this known transfer mechanism, only objects of the same length dimension can be separated out without leading to problems. If the length dimension of the objects to be separated out to the side varies, it is necessary to undertake modification work. Either the distance between the parallel tension belt strands has to be increased or additional tension belt strands have to be fitted.

A conveyor system with a different design of transfer mechanism for separating objects out to the side of this conveyor system onto another conveyor system disposed downstream of the transfer mechanism in the transfer direction of the conveyed objects is disclosed in patent specification DE 39 16 424 C2, which transfer mechanism is disposed at a distance above the conveyor systems and has flexible drives extending at an angle with respect to the conveying direction of the conveyor systems, on which non-moving drivers are mounted at a distance one after the other. Disposed on each driver is a conveyor plate which can be pivoted about a pivot axis extending in the conveying direction of the conveyor systems between a horizontal initial position and a vertical operating position oriented parallel with the conveying direction of the conveyor systems. By means of this conveyor plate, the object can be laterally gripped in the region of the top edge and separated out. The conveyor plates can be operated by means of a rack and pinion drive and a control cam, the latter being disposed parallel with the flexible drives. With this known transfer mechanism, the conveyed objects must necessarily be of a minimum height, which severely restricts the range of applications for which this conveyor system can be used.

Patent specification EP 0 062 233 A2 discloses a conveyor system with a transfer mechanism, by means of which the conveyed object can be separated from the first conveyor system and transferred onto another conveyor system disposed downstream of the transfer mechanism in the transfer direction of the conveyed objects. The transfer mechanism is provided in the form of a chain conveyor with two endless chains disposed parallel with one another. The chains are provided with knob-type drivers disposed in pairs at a distance from one another in their circulation direction and parallel with the longitudinal direction of the first conveyor system, which project out beyond a conveyor plane of the first conveyor system and are placed directly against the side wall of a conveyed object in order to separate it. The chains are disposed underneath the conveyor plane of the first conveyor system. Again with this design of transfer mechanism, the conveyed objects must necessarily be of a minimum length or width, which severely restricts the range of applications for which this conveyor system can be used.

Patent specification WO 98/57875 A1 discloses a conveyor system for sorting conveyed objects, with a first conveyor system and transfer mechanisms disposed along it, one after the other, by means of which the objects conveyed on the conveyor system can be selectively distributed or separated and transferred by one of the transfer mechanisms to a conveyor system or chute disposed downstream. Each transfer mechanism has a plurality of motor driven rollers disposed at a mutual distance apart and flexible drives extending parallel with one another along the conveyor system perpendicular to the conveying direction of the objects. Each flexible drive is coupled with a servo-motor which drives the traction means of the flexible drive in a controlled manner. The traction means of the flexible drives are provided with several knob-type drivers disposed at a distance apart from one another in the transfer direction of the transfer mechanism and projecting out beyond a conveyor plane formed by the conveyor system, by means of which a conveyed object is pushed from the first conveyor system onto another conveyor system adjoining the transfer mechanism. The servo-motors of the flexible drives and the drive motors of the rollers are connected to a control system, which in turn computes control signals depending on sensor signals and data about the target station or information about the conveyed object and such like, by means of which the drive and servo-motors of the rollers and flexible drives can be selectively activated. The highly complex system used to activate the flexible drives and hence the drivers has proved to be a disadvantage.

The objective of the invention is to propose a transfer mechanism of simple construction by means of which objects of differing length and if necessary height dimensions can be reliably separated from a first conveyor system and transferred to a second conveyor system, which operates at a high throughput rate at the first conveyor system incorporating the transfer mechanism and permits a compact disposition in a conveyor system.

This objective is achieved by the invention on the basis of the characterizing features defined in claims 1 and 22. The advantage gained as a result is that conveyed objects of differing length and optionally height dimensions can be reliably separated from the first conveyor system to the side and transferred to the other conveyor system via the profiled pushing element of the pushing unit and the system is not restricted to handling objects of a single length and optionally height dimension. In order to achieve as high a throughput rate as possible at the transfer mechanism, the conveyed object is separated out to the side of the first conveyor system as the conveyor element is driven. Another advantage is the fact that the pushing element can be positioned to the side, adjacent to the conveying path, in its initial position and in its operating position is placed exclusively against the rear side wall extending parallel with the conveying direction by reference to the transfer direction, which firstly means that any damage, in particular deformation, to the conveyed objects does not prevent them from being separated correctly and secondly, a short gap distance is selected between two objects conveyed one after the other on the first conveyor system, thereby enabling the throughput rate to be increased at the transfer mechanism. Furthermore, the articulated arrangement ensure that the pushing element is always maintained parallel with the conveyor plane and essentially parallel with the conveying direction of the objects. This enables a small air gap to be selected between the bottom edge of the pushing element travelling across the conveyor element and the conveyor element, and the pushing element is placed only shortly above the bottom longitudinal edge on the side wall of the conveyed object, which means that objects with side walls of a low dimensional stability can be pushed off without causing deformation. Since two flexible drives are now sufficient to drive a profiled pushing element, the transfer mechanism is of a simple and inexpensive construction.

The embodiments defined in claims 2 and 21 are also of advantage because the length of the pushing element is designed so that the object to be separated can be reliably guided laterally on the pushing element, as a result of which there is firstly absolutely no need to provide additional guide mechanisms and secondly, the need to position the conveyed object accurately in the longitudinal direction relative to the profiled pushing element is reduced because the object to be separated is able to slide along the pushing element to a limited degree as it is conveyed in the transfer direction. Accordingly, the conveyed objects can be separated efficiently and in the correct position even if the conveyed object is not accurately positioned longitudinally relative to the profiled pushing element due to the differing weights of the conveyed objects and the differing friction between the pushing element and conveyed object.

Claims 3 and 4 describe various advantageous arrangements for mounting the flexible drives on the frame of the first conveyor system.

Simple embodiments of the pushing element are described in claims 5 and 19.

The advantage of the embodiments defined in claims 6 and 20 is that the pushing element projects out from underneath the flexible drives beyond the conveyor plane, thereby resulting in a compact construction of the transfer mechanism.

Also of advantage is the embodiment defined in claim 7, as a result of which the conveyed object is separated and transferred to the other conveyor system at an angle with respect to the first conveyor system, which further optimizes the gap distance between two objects conveyed one after the other and improves the throughput rate of the transfer mechanism.

As defined in claim 8, before it enters the region of the conveying path, the pushing element is positioned so that a guide surface formed by the pushing element and the conveyor plane more or less subtend a right angle and an object being conveyed can be separated without any damage being caused, on the one hand. On the other hand, the pushing element can be moved so far away from the conveying path of the conveyed objects at the front transfer end in the transfer direction of the objects that the conveyed objects which do not have to be separated to the side of the first conveyor system are able to pass the transfer mechanism unobstructed.

The embodiment defined in claims 9 and 11 results in a particularly compact arrangement of the transfer mechanism in the first conveyor system.

The embodiment defined in claim 10 is of advantage because the distance between the first conveyor system and the other conveyor system disposed downstream of the transfer mechanism in the transfer direction can be kept short.

The embodiments defined in claims 12 and 13 enable the conveyed objects to be separated out from the first conveyor system and transferred to the other conveyor system in an exact position.

Also of advantage is the embodiment defined in claim 14, whereby a conveyed object can be separated unobstructed.

Claim 15 describes an advantageous embodiment of the articulated arrangement.

The embodiment defined in claim 16 is distinctive due to its simple construction, and by choosing an appropriate modulus of elasticity for the elastic spring element, the elasticity in the transfer direction can be used as a means of damping the impact which occurs when the pushing element hits against the objected to be separated.

Finally, the embodiments defined in claims 17 and 18 are of advantage because they enable the throughput rate of the transfer mechanism to be increased.

The invention will be explained in more detail with reference to examples of embodiments illustrated in appended drawings. Of these:

FIG. 1 is a highly simplified diagram showing a plan view of the conveyor system proposed by the invention and a transfer mechanism proposed by the invention co-operating with it, as well as another conveyor system disposed downstream of the transfer mechanism in the transfer direction;

FIG. 6 is a simplified diagram showing the pushing unit in section along line VI-VI indicated in FIG. 5;

FIG. 7 is a simplified diagram illustrating a side view of the pushing unit in partial section with another embodiment of the articulated arrangement.

Figure 4:
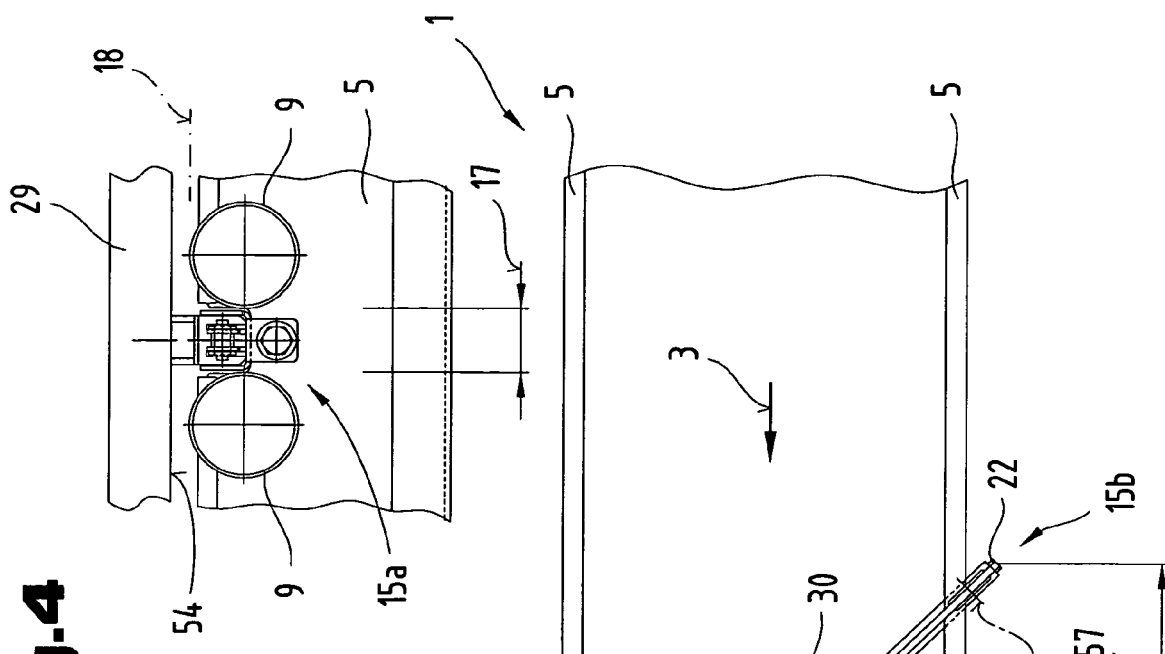
FIG. 4 is a highly simplified diagram showing a detail of the first conveyor system and the profiled pushing element in a front view onto the internal face of a frame section of the first conveyor system, along line IV-IV indicated in FIG. 3.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a detail of a conveyor system 1 proposed by the invention. It comprises a frame 2 with two frame sections 5 extending in the conveying direction—indicated by arrow 3—of objects, which are connected to one another by means of several cross-members (not illustrated) and thus held apart at a distance. An elongate guide section (not illustrated) is respectively disposed on and secured to the frame sections 5, extending in the conveying direction—indicated by arrow 3—by means of which the width 7 of a conveyor path 6 is laterally bounded. The conveyed objects 4 are conveyed along the conveyor path 6. The conveyor path 7 of the conveyor system 1 is sub-divided into three directly adjoining conveyor sections 8a, b, c in the conveying direction—indicated by arrow 3—of the conveyed objects 4. The conveyed objects 4 are preferably of a cuboid shape.

In a preferred embodiment, the conveyor system 1 is provided in the form of a roller conveyor comprising conveyor elements 9 in the form of a plurality of conveyor rollers in each conveyor section 8a, b, c, which are retained between the frame sections 5 and disposed at a distance apart from one another along the conveyor path 6. As schematically indicated by dotted-dashed lines, a constantly circulating, endless traction means 10a, in particular a belt, is provided as a means of driving the conveyor rollers in the conveyor sections 8a, c, which is disposed underneath the conveyor rollers and pressed against each conveyor roller extending across the entire width 7 between the frame sections 5 in the conveyor sections 8a, thereby applying pressure to every individual conveyor roller in the conveyor section 8c. In order to drive the conveyor rollers in conveyor sections 8a, which are disposed across only a part of the width 7 between the frame sections 5, and the outer conveyor rollers in the middle conveyor section 8b, a constantly circulating, endless traction means 10b is provided, in particular a belt, which is disposed underneath the conveyor rollers and pressed against the conveyor rollers of the conveyor sections 8a, b mounted adjacent to a frame section 5. The other inner conveyor rollers in the middle conveyor section 8b are coupled with the outer conveyor rollers by means of schematically indicated overdrive gears 55. To this end, the overdrive gears 55 are disposed axially parallel with the conveyor rollers and are applied between them on the bottom face of the conveyor section 8b and against two conveyor rollers lying adjacent to one another. The traction means 10a, b are preferably driven synchronously by means of only one common drive motor (not illustrated).

The conveyor sections 8a, b, c and their conveyor rollers are preferably driven synchronously and in the same direction so that the conveyed objects 4 can be conveyed along the conveyor path 6 at the same feed rate.

Although not illustrated, at least one optical sensor, for example a light barrier, bar code reader or such like, is disposed in the frame 2, which detects a data carrier, for example a bar code label, provided on the conveyed objects 4, reads information from the data carrier and transmits control signals to a control system, which in turn activates a drive motor 11 of a transfer mechanism 12 when a conveyed object 4 has to be separated off to the side of this first conveyor system 1 and transferred to another conveyor system 14 disposed down-stream of the transfer mechanism 12 in the transfer direction—indicated by arrow 13. The conveyed object 4 is preferably separated out from the conveyor system 1 with the conveyor rollers running. This being the case, the conveyed objects 4 are transferred from the first conveyor system 1 to the other conveyor system 14 in the same position. The other conveyor system 14 directly adjoins the transfer mechanism 12 and extends parallel with and adjacent to the first conveyor system 1, or extends perpendicular to the first conveyor system 1. The other conveyor system 14 is provided in the form of a belt conveyor, roller conveyor or similar, for example.

Figure 2:
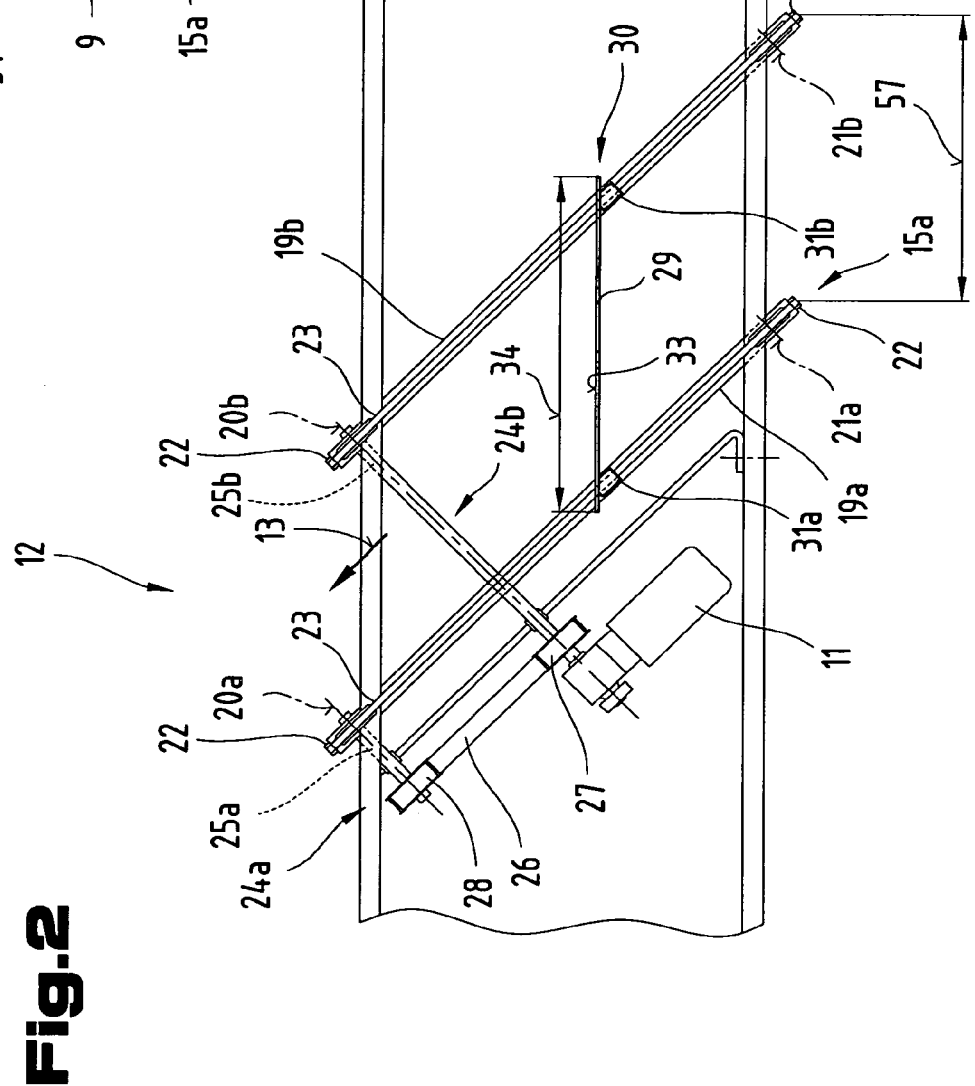
FIG. 2 is a highly simplified diagram showing a plan view of the transfer mechanism illustrated in FIG. 1 and a portion of the first conveyor system.
Figure 3:
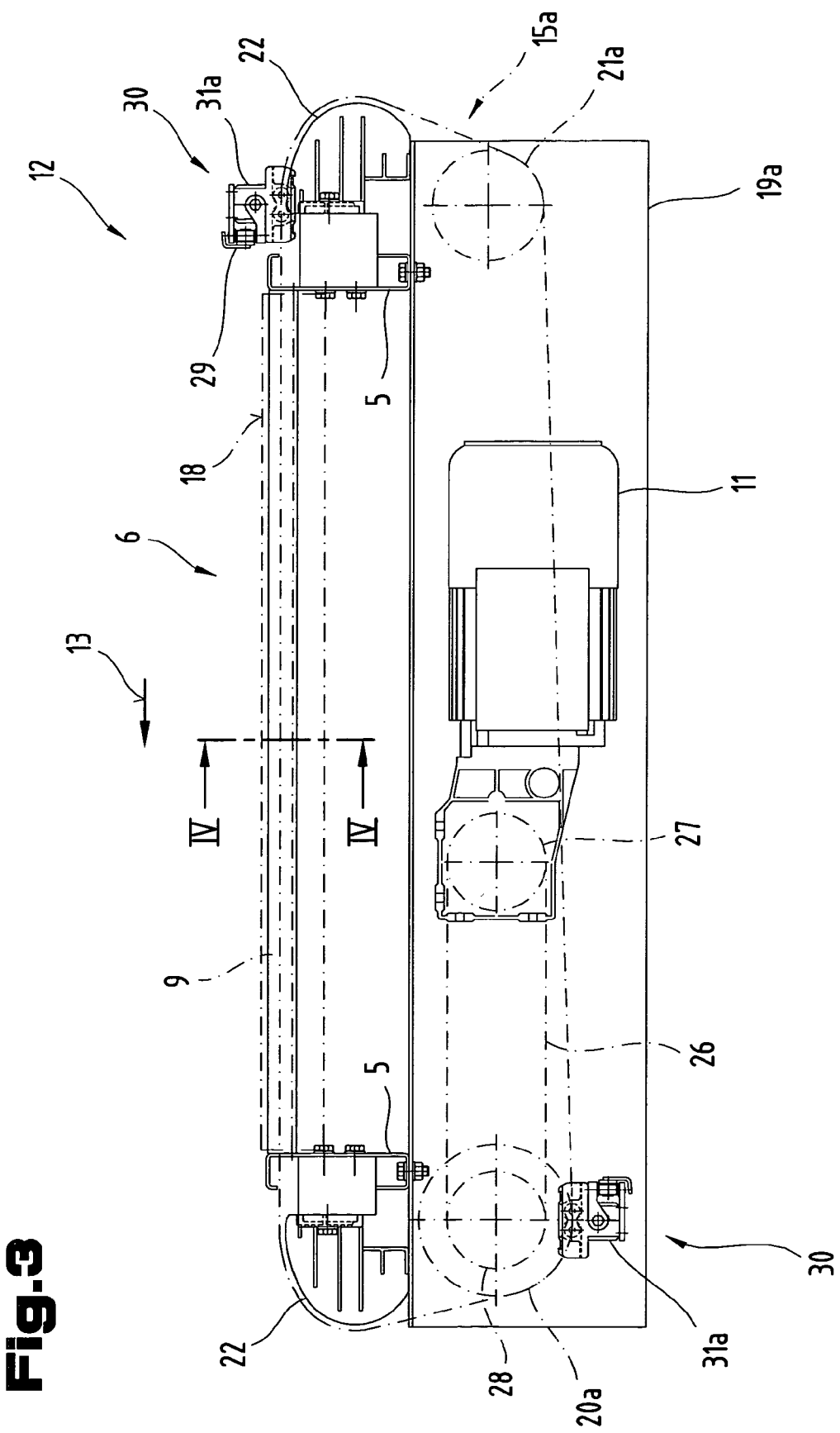
FIG. 3 is a highly simplified diagram showing a front view of the transfer mechanism in the direction of circulation of a flexible drive incorporating it, with a drive motor and the pushing units.

As illustrated in FIGS. 1 to 3, this transfer mechanism 14 proposed by the invention is disposed in the middle conveyor section 8b of the conveyor system 1 and mounted on the frame 2. It preferably has only two flexible drives 15a, b extending parallel with a space 57 between, disposed at an angle 16 of less than 90°, preferably 45°, with respect to the longitudinal extension of the first conveyor system 1 in the direction of the speed resulting from the speed of the driven conveyor rollers in the middle conveyor section 8b and the transfer speed oriented transversely to it. This space 57 between the flexible drives 15a, b parallel with the conveying direction—indicated by arrow 3—preferably more or less corresponds to the maximum length dimension 35 of the conveyed object 4.

As illustrated in FIG. 1, a spacing gap 17 is formed respectively parallel with the flexible drives 15a, b extending across the entire width 7 of the conveyor path 6 between the mutually facing terminal ends of the consecutive conveyor sections 8a, 8b, 8c in the conveying direction—indicated by arrow 3—of the conveyed objects 4. Each spacing gap 17 has extending through it, from underneath a horizontal conveyor plane 18 of the conveyor sections 8a, b, c, the flexible drive 15a, b of the transfer mechanism 12 and is narrower than the minimum length dimension of the conveyed object 4. The parallel flexible drives 15a, b are of the same length and are disposed offset from one another in the transfer direction—indicated by arrow 13. In the case of the embodiment illustrated, oppositely lying terminal ends of the flexible drives 15a, b project out laterally from both frame sections 5 and terminal edges of the flexible drives 15a, b extend parallel with the longitudinal direction of the first conveyor system 1. Alternatively, the flexible drives 15a, b extending offset at an angle with respect to the longitudinal direction of the conveyor system 1 may also be disposed between the frame sections 5 underneath the conveyor plane 18, in which case their terminal edges likewise extend parallel with the longitudinal direction of the first conveyor system 1. Accordingly, the flexible drives 15a, b extend across only a part of the width 7 of the conveyor path 6 or across the entire width 7 of the conveyor path 6.

As illustrated in FIGS. 1 and 3, the flexible drives 15a, b are respectively secured to a support frame 19a, b on the frame 2 of the first conveyor system 1 and respectively comprise a drive and guide pulley 20a, b, 21a, b mounted so as to be rotatable on the support frame 19a, b, two pulleys 22 and at least one endlessly circulating traction means 23 guided around the drive and guide pulley 20a, b, 21a, b as well as the pulleys 22. The pulleys 22 are respectively disposed on external faces of the frame sections 5 facing away from one another, above the support frame 19a, b, and secured to the latter. The top strand of the traction means 23 of the flexible drives 15a, b facing a conveyor plane 18 formed by the conveyor elements 9 of the first conveyor system 1 is guided between the pulleys 22 on a respective running path (not illustrated) extending horizontally in the transfer direction indicated by arrow 13.

As illustrated in FIGS. 1 to 3, the driving gear 20a for the first flexible drive 15a is coupled with and drivingly connected to the drive motor 11, in particular an electric motor, via a first drive means 24a. The driving gear 20b for the second flexible drive 15b is likewise coupled with and drivingly connected to the drive motor 11 via a second drive means 24b. As a result, the traction means 23 of the two flexible drives 15a, b are driven synchronously and the traction means 23 circulate at the same circulation speed. The driving gears 20a, b and drive means 24a, b are therefore in a positively engaging arrangement so that the driving force of the drive motor 11 is transmitted to the traction means 23 of the two flexible drives 15a, b without any slip. In the embodiment illustrated here, the first drive means 24a has a drive shaft 25a bearing the driving gear 20a and a drive train 26 in the form of an endlessly circulating traction means, such as a chain, toothed belt or similar, and the drive train 26 is turned about a driven first gear 27 connected to the drive motor 11 and a freely rotatable second gear 28. The gear 28 and driving gear 20a are connected to one another on the drive shaft 25a so as to rotate in unison. In the embodiment illustrated here, the second drive means 24b has a drive shaft 25b bearing the driving gear 20b and the drive shaft 25b is directly connected to the drive motor 11 and provides a bearing for the gear 27 and the driving gear 20b which are connected to one another so as to rotate in unison.

The transfer mechanism 12 illustrated in FIGS. 1 to 3 comprises the drive motor 11 mounted on the frame 2, the flexible drives 15a, b drivingly connected to or coupled with it, the support frames 19a, b and at least one pushing unit 30 for separating a conveyed object 4. This pushing unit 30 has at least one pushing element 29 and at least one pair of drivers 31a, b, as will be explained below. The traction means 23 of the flexible drives 15a, b are provided with drivers 31a, b arranged in pairs extending parallel with the longitudinal direction of the first conveyor system 1, by means of which a pushing element 29 of the pushing unit 30 is articulatingly connected by means of articulated arrangements that will be described in more detail. The drivers 31a, b mounted on the first and second traction means 23 so that they are unable to move are disposed apart from one another.

Since providing a compact design of the transfer mechanism 12 is a primary objective, the flexible drives 15a, b are disposed offset from one another in their longitudinal direction, as illustrated in FIGS. 1 and 2, so that terminal edges or terminal end regions of the flexible drives 15a, b extend parallel with the longitudinal direction of the first conveyor system 1. However, it is therefore necessary to be able to move the pushing element 29 via a first articulated arrangement 36 on the driver 31a of the first traction means 23 in at least two axial directions to a limited degree and it is mounted on the driver 31b of the second traction means 23 via a second articulated arrangement 36 so that it can be moved in at least two axial directions to a limited degree.

The transfer mechanism 12 preferably has two pushing units 30 with two pushing elements 29 extending in the circulation direction of the traction means 23 held at a distance apart from and parallel with one another in the conveying direction—indicated by arrow 3—of the conveyed objects 4, as well as parallel with the conveyor plane 18, which are respectively articulated by means of the two articulated arrangements, each on a pair of drivers 31a, b. The two pairs of drivers 31a, b are mounted externally on the traction means 23, separated from one another by a distance corresponding to the distance of the pushing elements 29.

The distance of the pushing elements 29 in the circulation direction of the traction means 23 is at least slightly bigger than a maximum width 56 of the conveyed object 4 as measured perpendicular to the longitudinal direction of the first conveyor system 1, so that when the first pushing element 29 has pushed a conveyed object 4 straight out of the first conveyor system 1 and moved it beyond the conveyor path 6, the second pushing element 29 is standing by in an initial position, as indicated by broken lines in FIG. 1, in readiness at the side, adjacent to the conveyor path 6. When the controlled drive motor 11 is set in motion, the first pushing element 29 moves in the anti-clockwise direction out of its initial position into the operating position in the conveyor path 6, as indicated by solid lines in FIG. 1, in which a conveyed object 4 is pushed off. Since the pushing elements 29 are coupled so that they move together, the second pushing element 29 is also moved in the anti-clockwise direction so that the second pushing element 29 disposed at the bottom left-hand side is not positioned in the initial position until after half a revolution, after which it is moved along a conveyed object 4 and separates it.

Each pushing element 29 of the transfer mechanism 12, which can be displaced, in particular pushed, by means of the flexible drives 15a, b between the initial position and operating position, as illustrated by solid lines in FIG. 1, extends in the longitudinal direction of the first conveyor system 1 between the parallel flexible drives 15a, b in the space 57 and at least one conveyor element 9 projects out from underneath in the middle conveyor section 8b beyond the conveyor plane 18. The conveyed object 4 is engaged by means of the pushing element 29 projecting out from underneath the conveyor plane 18 shortly above its bottom edge in the dimensionally stable region. In the initial position, a pushing element 29 is positioned to the side, adjacent to the conveyor path 6, whereas in the operating position, a pushing element 29 can be displaced linearly in a horizontal plane into the conveyor path 6 and beyond the conveyor path 6 to the side of the conveyor system 1.

The pushing elements 29 incorporating the transfer mechanism 12 are identical and are respectively provided in the form of an elongate section with an L-shaped, rounded, oval or polygonal cross-section and have a front end face with a guide surface 33 in the transfer direction—indicated by arrow 13—on which one side of the preferably cuboid object 4 to be separated sits. A length 34 of the pushing element 29 corresponds to at least half the maximum length dimension 35 of the conveyed object 4. In one possible variant, the pushing element 29 is of a length 34 more or less corresponding to the maximum length dimension 35 of the conveyed object 4. This therefore means that objects 4 of differing length dimensions 35 can be separated by the transfer mechanism 12.

Figure 5:
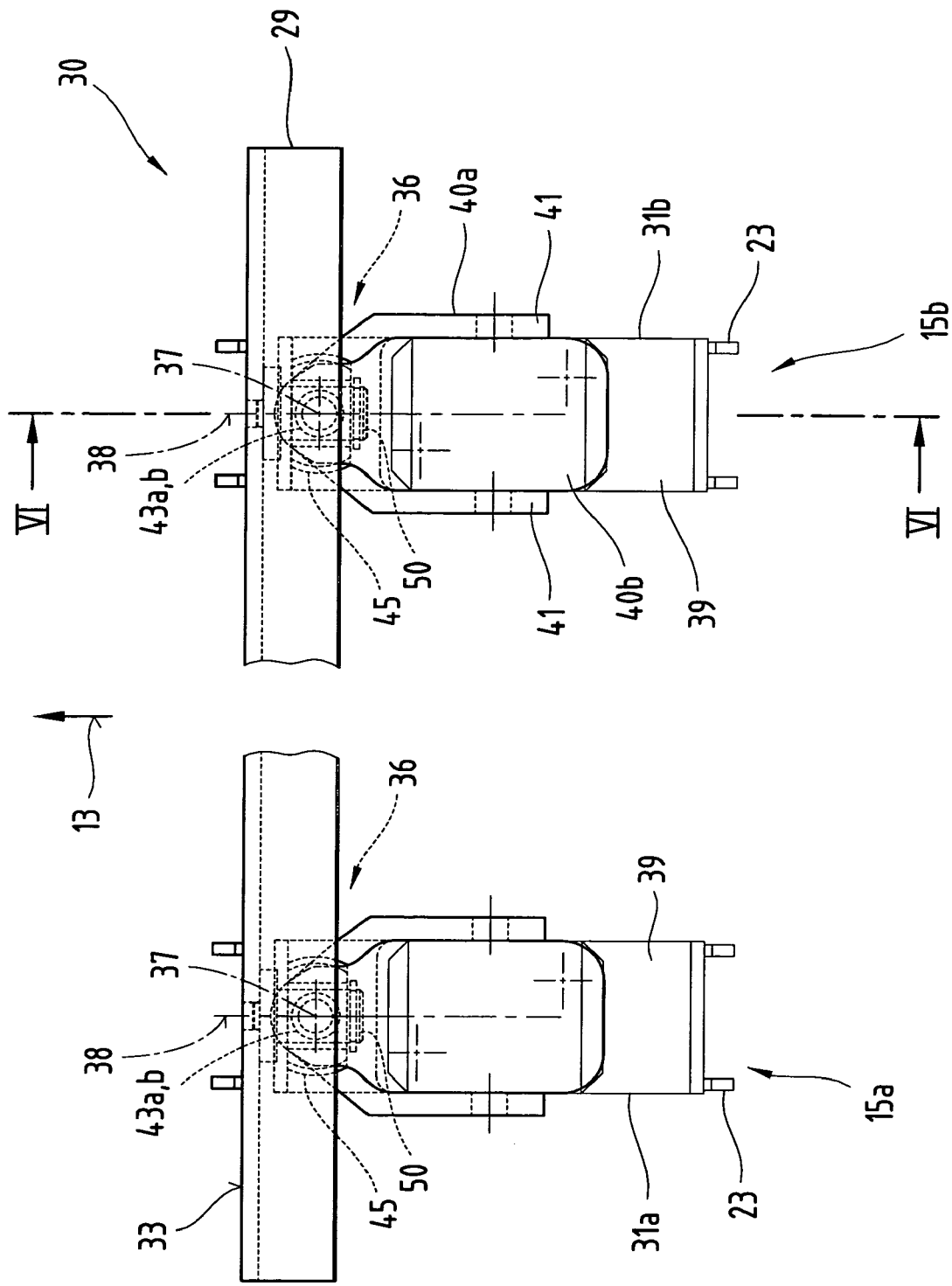
FIG. 5 is a highly simplified diagram showing a plan view of the pushing unit with the profiled pushing element and the pair of drivers mounted on the traction means of the flexible drives as well as the articulated arrangements between the pushing element and the drivers.

FIGS. 5 and 6, which will be described together, are different views illustrating a part-section of a flexible drive 15a, b and a profiled pushing element 29 of the pushing unit 30. As already described above, the pushing element 29 in this embodiment is mounted by means of two articulated arrangements 36 so that it can move to a limited degree exclusively about the first axis 37 extending perpendicular to the conveyor plane 18 for the conveyed objects 4 (not illustrated) and about the second axis 38 extending in the transfer direction—indicated by arrow 13—of the transfer mechanism 12, in particular pivoted on the drivers 31a, b. The articulated arrangements 36 are respectively disposed behind the pushing element 29 as viewed in the transfer direction—indicated by arrow 13—of the objects 4 to be separated, between the drivers 31a, b and a rear longitudinal face of the pushing element 29 as viewed in the transfer direction—indicated by arrow 13—of the conveyed objects 4.

Each driver 31a, b has a prismatic support body 39 secured to the respective traction means 23 and a bottom and top bearing flange 40a, connected to it so as to be prevented from moving. The bottom bearing flange 40a is of a fork-type design and extends round both sides of the support body 39 with its freely projecting lugs 41, forming a mounting bore 43a at its base part 42 connecting the bearing flanges 40a, b. The top bearing flange 40b, on the other hand, is of a plate-type design and is secured to the support body 39 at the top face and is provided with a mounting bore 43b at its end projecting onto the support body 39. The mounting bores 43a, b are disposed vertically one above the other and their common axis 37 extends perpendicular to the conveyor plane 18. A respective slide bearing bush 44 is pressed into the mounting bores 43a, b.

As illustrated in the drawings, each articulated arrangement 36 has a compensating joint 45, comprising a prismatic base body 46, two axially parallel bearing pins 47 projecting laterally out from it and a mounting bore 48 extending through the base body 46. The axis 38 of the mounting bore 48 extends parallel with the transfer direction—indicated by arrow 13—of the object 4 to be separated. The compensating joint 45 is mounted by means of the bearing pins 47 so as to be pivotable to a limited degree about the axis 37 on the driver 31a, b, in particular the bearing flanges 40a, b. A slide bearing bush 49 is in turn inserted in the mounting bore 48. The pushing element 29 is in turn mounted by means of the bearing pin 50 mounted on it so as to be pivotable to a limited degree about the second axis 38 extending in the transfer direction—indicated by arrow 13—of the objects 4 to be separated, on the driver 31a, b, in particular on the compensating joint 45. This being the case, the bearing pins 50 on the pushing element 29 are inserted in the mounting bores 48 of the compensating joints 45 and held in position in the axial direction by means of a locking ring, for example. The bearing pins 50 are secured to the pushing element 29, for example welded, in the region of what is the rear longitudinal face by reference to the transfer direction—indicated by arrow 13.

FIG. 7 illustrates the pushing unit 30 with a different embodiment of the articulated arrangement 36. This pushing unit 30 comprises the drivers 31a, b, the pushing element 29 and the articulated arrangements 36. Each articulated arrangement 36 in turn has a compensating joint 45. Disposed on the support body 39 of every driver 31a, b is a bearing pin 51 extending in the transfer direction—indicated by arrow 13—constituting the second axis 38 on which the compensating joint 45 is mounted so as to be pivotable about the second axis 38 on the driver 31a, b. In this embodiment, the pushing element 29 has a C-shaped cross-section and is provided respectively with a mounting bore 43a, b oriented perpendicular to the conveyor plane 18 on its freely projecting legs 52, in which the slide bearing bushes 44 are pressed, and bearing pins 47 project out from the compensating joint 45. The mounting bores 43a, b are disposed vertically one above the other and their common axis 37 extends perpendicular to the conveyor plane 18 and is oriented radially with respect to the bearing pin 51. A base 53 of the pushing element 29 connecting the legs 52 forms the guide surface 33 for the object 4 to be separated at its front longitudinal face in the transfer direction—indicated by arrow 13. Accordingly, in this embodiment too, the pushing element 29 is mounted so that it can be moved to a limited degree, in particular pivoted on the drivers 31a, b by means of the two articulated arrangements 36 exclusively about the first axis 37 extending perpendicular to the conveyor plane 18 for the conveyed objects 4 (not illustrated) and about the second axis 38 extending in the transfer direction indicated by arrow 13—of the transfer mechanism 12.

In another embodiment, although this is not illustrated, the articulated arrangement 36 has a compensating joint in the form of a resilient spring element made from rubber, plastic (elastomers), metal or similar, in particular a rubber spring element or a rubber-metal spring, such as a thrust-plate spring, disposed between two parallel support plates. Consequently, the pushing element 29 is suspended on the drivers 31a, b in a floating arrangement by means of the articulated arrangements 36 and one respective support plate is connected to the driver 31a, b and moves in unison with it, whilst the other support plate is connected to the pushing element 29 and moves in unison with it. By selecting the modulus of elasticity of the spring element accordingly, the ability of the pushing element 29 to be moved can be specifically determined so that the support plates can be pushed towards one another to a limited degree in their parallel planes and the pushing element 29 is always retained essentially parallel with the longitudinal direction of the conveyor system 1 and parallel with the conveyor plane 18 and subtends an angle of approximately 90° with the conveyor plane 18. In this embodiment, the pushing element 29 is mounted by means of the articulated arrangements 36 so that it can be moved to a limited degree about the first axis 37 extending perpendicular to the conveyor plane 18 for the conveyed objects 4 (not illustrated) and about the second axis 38 extending in the transfer direction—indicated by arrow 13—on the drivers 31a, b.

The purpose of the articulated arrangements 36 described above is to provide the requisite angular compensation of the pushing element 29 relative to the compact flexible drives 17a, b disposed offset in the transfer direction—indicated by arrow 13—(as described above), whilst the pulley of the pushing element 29 coupled with the traction means 23 so as to effect displacement is retained on the pulleys 22, drive and guide pulley 20a,b, 21a, b, so that the pushing element 29 is always parallel with the longitudinal direction of the conveyor system 1 and parallel with the conveyor plane 18 and is therefore not subjected to mechanical stress. Furthermore, as a result of the articulated arrangements 36, any change in the vertical distance between the bottom edge 54 of the pushing element 29 and the conveyor plane 18 can be ruled out.

Finally, it should also be pointed out that, within the meaning of the invention, another option is one whereby the first conveyor system 1 has an endlessly circulating conveyor belt as the conveyor element 9 or several conveyor elements 9 in the corresponding conveyor sections 8a, b, c, in which case the latter are provided in the form of at least two mutually parallel strands of traction means such as belts, chains or similar spaced at a distance apart from one another and extending in the conveying direction—indicated by arrow 3. This being the case, the top strand of the conveyor belt or strand of the traction means forms the conveyor plane 18 for the conveyed objects 4 supported on it. The flexible traction means 23 of the flexible drives 15a, b are provided in the form of a toothed belt, a chain or similar. Another option is to provide the articulated arrangement 36 in the form of a ball joint disposed between the driver 31a, b and the pushing element 29, whereby a relative movement of the pushing element 29 in the vertical direction with respect to the conveyor plane 18 is prevented. In a preferred variant, only two flexible drives 15a, b are used, between which the pushing element 29 is disposed in the manner described above. In principle, although this is not illustrated, another possibility is to use more than two, for example three or four, flexible drives 15a-n, in which case the pushing element 29 will extend continuously between the two outer flexible drives parallel with the longitudinal direction of the first conveyor system 1 and an articulated arrangement 36 is provided respectively between the pushing element 29 and the co-operating flexible drive 15a-n.

In another embodiment, which again is not illustrated, the pushing element 29 may be provided in the form of a comb profile, the tines of which are directed downwards towards the traction means 23 and a bottom edge 54 of the pushing element 29 extends underneath the conveyor plane 18.

For the sake of good order, finally, it should be pointed out that in order to provide a clearer understanding of the construction of the conveyor system 1 and transfer mechanism 12, they and their constituent parts are illustrated to a certain extent out of scale and/or on an enlarged scale and/or on a reduced scale.

Above all, the subject matter of the individual embodiments illustrated in FIG. 1 to 7 may be construed as independent solutions proposed by the invention.

LIST OF REFERENCE NUMBERS

1 Conveyor system
2 Frame
3 Arrow
4 Conveyed object
5 Frame section
6 Conveyor path
7 Width 24a Drive means
8a Conveyor section
8b Conveyor section
8c Conveyor section
9 Conveyor element
10a Traction means
10b Traction means
11 Drive motor
12 Transfer mechanism
13 Arrow
14 Conveyor system
15a Flexible drive
15h Flexible drive
16 Angle
17 Spacing gap
18 Conveyor plane
19a Support frame
19b Support frame
20a Driving gear
20b Driving gear
21a Guide pulley
21b Guide pulley
22 Pulley
23 Traction means
24a Drive means
24b Drive means
25a Drive shaft
25b Drive shaft
26 Drive Train
27 Gear
28 Gear
29 Pushing element
30 Pushing unit
31a Driver
31b Driver
32
33 Guide surface
34 Length
35 Length dimension
36 Articulated arrangement
37 Axis
38 Axis
39 Support body
40a Bearing flange
40b Bearing flange
41 Lug
42 Base part
43a Mounting bore
43b Mounting bore
44 Slide bearing bush
45 Compensating joint
46 Base body
47 Bearing pin
48 Mounting bore
49 Slide bearing bush
50 Bearing pin
51 Bearing pin
52 Leg
53 Base
54 Bottom edge
55 Overdrive gear
56 Width
57 Space

The invention claimed is:

1. Transfer mechanism (12) for separating conveyed objects (4) out to the side from a single row conveyed on a first conveyor system (1) onto another conveyor system (14) disposed downstream of the transfer mechanism (12) in the transfer direction (13) of the conveyed objects (4), having
i) at least two parallel flexible drives (15a, b) of equal length extending at a distance apart and in an angle with respect to the longitudinal direction of the first conveyor system (1) and which can be driven synchronously, the flexible drives (15a, b) being disposed underneath a horizontal conveyor plane (18) formed by the first conveyor system (1) and offset from one another in their longitudinal direction, and comprising endlessly circulating traction means (23) and drivers (31a, b) mounted on the circulating traction means (23) lying opposite one another in pairs in a plane extending parallel with the conveying direction (3) of the conveyed objects (4) along the first conveyor system (1), wherein the terminal end regions of the flexible drives (15a, b) extend parallel with the longitudinal direction of the first conveyor system (1), and ii) at least one pushing unit (30) comprising at least one pushing element (29) for separating a conveyed object (4) from the first conveyor system (1) onto the another conveyor system (14), wherein the pushing element (29) extends continuously between the drivers (31a, b) and comprises a guide surface (33) essentially parallel to the conveying direction (3) of the first conveyor system (1) and is mounted on each driver (31a, b) of the first and second traction means (23) by means of an articulated arrangement (36) in such a manner that the pushing element (29) can be pivoted about the first axis (37) extending perpendicular to the conveyor plane (18) of the conveyed objects (4) and about the second axis (38) extending parallel with the transfer direction (13) of the transfer mechanism (12).

2. Transfer mechanism according to claim 1, wherein the pushing element (29) is of a length (34) which corresponds to at least half the maximum length dimension (35) of the conveyed object (4) to be separated.

3. Transfer mechanism according to claim 1, wherein the flexible drives (15a, b) extend across the entire width of the first conveyor system (1).

4. Transfer mechanism according to claim 1, wherein the flexible drives (15a, b) extend across only a part-width of the first conveyor system (1).

5. Transfer mechanism according to claim 1, wherein the pushing element (29) is provided in the form of a rule-type elongate section and extends continuously between the drivers (31a, b) and flexible drives (15a, b) at a slight distance above the conveyor plane (18).

6. Transfer mechanism according to claim 1, wherein the pushing element (29) is provided in the form of a comb profile, the tines of which are directed downwards towards the traction means (23) and dip down between adjacent conveyor elements (9) in a conveyor section (8b) of the first conveyor system (1), and a bottom edge (54) extends underneath the conveyor plane (18).

7. Transfer mechanism according to claim 1, wherein the parallel flexible drives (15a, b) extend at an angle (16) with respect to the longitudinal extension of the first conveyor system (1) in the direction of the speed vector resulting from the speed vector of a middle conveyor section (8b) of the first conveyor system (1) and the transfer speed vector oriented transversely to it.

8. Transfer mechanism according to claim 1, wherein a length of the flexible drives (15a, b) is bigger than the width (7) of the conveyor path (6) and the flexible drives (15a, b) extend laterally on both sides beyond the conveyor path (6).

9. Transfer mechanism according to claim 1, wherein a length of the flexible drives (15a, b) approximately corresponds to the width (7) of the conveyor path (6) and the flexible drives (15a, b) are disposed between frame sections (5) of the first conveyor system (1).

10. Transfer mechanism according to claim 1, wherein the flexible drives (15a, b) are of equal length and are disposed offset from one another in their longitudinal direction, and project laterally with their oppositely lying terminal ends on frame sections (5) of the first conveyor system (1) in the conveying direction (3) of the conveyed objects (4) extending parallel at a distance apart and their terminal edges extend parallel with the longitudinal direction of the first conveyor system (1).

11. Transfer mechanism according to claim 1, wherein the flexible drives (15a, b) are of equal length and offset from one another in their longitudinal direction and are disposed between the frame sections (5) of the first conveyor system (1) extending in the conveying direction (3) of the conveyed objects (4) extending parallel at a distance apart, and their terminal edges extend parallel with the longitudinal direction of the first conveyor system (1).

12. Transfer mechanism according to claim 1, wherein the flexible drives (15a, b) each have a driving gear (20a, b), at least one guide pulley (21a, b) and/or pulleys (22) and the traction means (23) guided around the drive and guide pulley (20a, b, 21a, b) and/or pulleys (22), and the traction means (23) of the flexible drives (15a, b) are driven in synchronization.

13. Transfer mechanism according to claim 1, wherein the pushing element (29) forms a preferably flat guide surface (33) for the conveyed object (4) to be separated on its front longitudinal face as viewed in the transfer direction (13) of the conveyed objects (4) to be separated, and the guide surface (33) and conveyor plane (18) more or less subtend a right angle.

14. Transfer mechanism according to claim 1, wherein the pushing element (29) is provided behind every articulated arrangement (36) as viewed in the transfer direction (13) of the conveyed objects (4), disposed between the relevant driver (31a, b) and a rear longitudinal face of the pushing element (29) as viewed in the transfer direction (13) of the conveyed objects (4).

15. Transfer mechanism according to claim 1, wherein every articulated arrangement (36) has a compensating joint (45) and the compensating joint (45) is mounted so that it is able to move, in particular pivot on the relevant driver (31a, b), about the second axis (38) extending in the transfer direction (13) of the conveyed objects (4) of the transfer mechanism (12), and the pushing element (29) is mounted so that it can be moved, in particular pivoted, on the compensating joint (45) about the first axis (37) oriented radially with respect to the second axis (38).

16. Transfer mechanism according to claim 1, wherein every articulated arrangement (36) has a compensating joint (45), which is provided in the form of a spring element, in particular a rubber spring element, disposed between two support plates, in which case one support plate is connected to the relevant driver (31a, b) so as to move in unison with it and the other support plate is connected to the pushing element (29) so as to move in unison with it.

17. Transfer mechanism according to claim 1, wherein a second pushing unit (30) is provided, which comprises another pushing element (29) for separating a conveyed object (4) which can be moved from an initial position at the side, adjacent to the conveyor path (6) of the conveyed objects (4), into an operating position in the conveyor path (6) of the conveyed objects (4), and the flexible drives (15a, b) have drivers (31a, b) mounted on the traction means (23) lying opposite one another in pairs one after the other at a distance apart in the transfer direction (13) and in a plane extending parallel with the conveying direction (3) of the conveyed objects (4) along the first conveyor system (1), and the other pushing element (29) extends continuously between the other drivers (31*a, b*) and always extends essentially parallel with the conveying direction (3) of the conveyed objects (4) and is mounted so that it can be moved, in particular pivoted on every other driver (31*a, b*) of the first and second traction means (23) by means of a respective articulated arrangement (36) about the first axis (37) extending perpendicular to the conveyor plane (18) of the conveyed objects (4) and about the second axis (38) extending parallel with the transfer direction (13) of the transfer mechanism (12).

18. Transfer mechanism according to claim 17, wherein a distance between the pushing elements (29) is bigger than a maximum width (56) of the conveyed object (4) as measured perpendicular to the longitudinal direction of the first conveyor system (1).

19. Transfer mechanism according to claim 17, wherein the other pushing element (29) is provided in the form of a rule-type elongate section and extends continuously between the other drivers (31*a, b*) and flexible drives (15*a, b*) at a slight distance above the conveyor plane (18).

20. Transfer mechanism according to claim 17, wherein the other pushing element (29) is provided in the form of a comb profile, the tines of which are directed downwards towards the traction means (23) and dip down between adjacent conveyor elements (9) in a conveyor section (8*b*) of the first conveyor system (1), and a bottom edge (54) extends underneath the conveyor plane (18).

21. Transfer mechanism according to claim 17, wherein the other pushing element (29) is of a length (34) which corresponds to at least half the maximum length dimension (35) of the conveyed object (4) to be separated.

22. Conveyor system (1) for conveying objects (4) along a conveyor path (6) which is sub-divided into at least three conveyor sections (8*a, b, c*), and every conveyor section (8*a, b, c*) has at least one conveyor element (9), having a transfer mechanism (12) in the middle conveyor section (8*b*) for conveying objects (4) as and when necessary from a single row on the first conveyor section (8*a*) onto another conveyor system (14) disposed downstream of the transfer mechanism (12) in the transfer direction (13) of the conveyed objects (4), the transfer mechanism (12) comprising i) at least two parallel flexible drives (15*a*, 15*b*) of equal length extending at a distance apart and in an angle with respect to the longitudinal direction of the first conveyor system (1) and which can be driven synchronously, the flexible drives being disposed underneath a horizontal conveyor plane (18) formed by the first conveyor system (1) and offset from one another in their longitudinal direction, and comprising endlessly circulating traction means (23) and drivers (31*a, b*) mounted on the circulating traction means (23) lying opposite one another in pairs in a plane extending parallel with the conveying direction (3) of the conveyed objects (4) along the first conveyor system (1), wherein the terminal end regions of the flexible drives (15*a, b*) extend parallel with the longitudinal direction of the first conveyor system (1), and ii) at least one pushing unit (30) comprising at least one pushing element (29) for separating a conveyed object (4) from the first conveyor system (1) onto the another conveyor system (14), wherein the pushing element (29) extends continuously between the drivers (31*a, b*) and comprises a guide surface (33) essentially parallel to the conveying direction (3) of the first conveyor system (1) and is mounted on each driver (31*a, b*) of the first and second traction means (23) by means of an articulated arrangement (36) in such a manner so that the pushing element (29) can be pivoted about the first axis (37) extending perpendicular to the conveyor plane (18) of the conveyed objects (4) and about the second axis (38) extending parallel with the transfer direction (13) of the transfer mechanism (12).

23. Conveyor system according to claim 22, wherein a spacing gap (17) is formed between mutually facing terminal ends of the consecutive conveyor sections (8*a, b, c*) in the conveying direction (3) of the conveyed objects (4) and respectively extends parallel with the flexible drives (15*a, b*) at least across the entire width (7) of the conveyor path (6) or across a part of the width (7) of the conveyor path (6).

* * * * *